Figure 13:
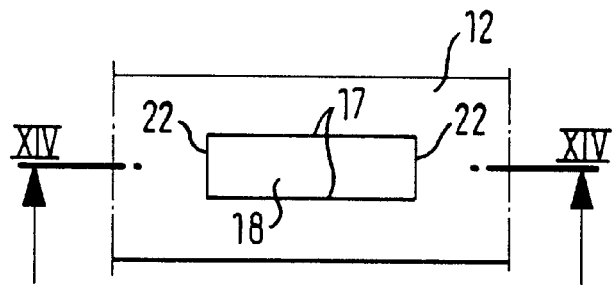

United States Patent
Einsiedel et al.

[11] Patent Number: 6,164,688
[45] Date of Patent: Dec. 26, 2000

[54] AIRBAG APPARATUS FOR MOTOR VEHICLES

[75] Inventors: Heinrich Einsiedel, Ulm; Benedikt Heudorfer; Oliver Glöckler, both of Nersingen; Uwe Klaiber, Heidenheim, all of Germany

[73] Assignee: Takata (Europe) Vehicle Safety Technology GmbH, Ulm, Germany

[21] Appl. No.: 09/246,850

[22] Filed: Feb. 9, 1999

[30] Foreign Application Priority Data

Mar. 24, 1998 [DE] Germany .............. 198 12 915

[51] Int. Cl.⁷ .................................. B60R 21/22
[52] U.S. Cl. ........................ 280/730.2; 280/736
[58] Field of Search .................... 280/730.1, 730.2, 280/728.2, 743.1, 729, 736, 741, 742

[56] References Cited

U.S. PATENT DOCUMENTS 5,788,270  8/1998  Haland et al. .......... 280/730.2

FOREIGN PATENT DOCUMENTS

| 1 956 677 | 6/1970 | Germany . |
|---|---|---|
| 2 222 621 | 11/1972 | Germany . |
| 41 34 995 | 3/1993 | Germany . |
| 44 26 848 | 2/1996 | Germany . |
| 296 10 920 | 10/1996 | Germany . |
| 296 11 685 | 10/1996 | Germany . |
| 296 13 781 | 11/1996 | Germany . |
| 296 14 201 | 11/1996 | Germany . |
| 196 13 095 | 10/1997 | Germany . |
| 196 13 133 | 10/1997 | Germany . |
| 196 27 181 | 1/1998 | Germany . |
| 298 04 004 | 8/1998 | Germany . |
| 2 314 300 | 12/1997 | United Kingdom . |
| WO 96/26087 | 8/1996 | WIPO . |

*Primary Examiner*—Paul N. Dickson
*Attorney, Agent, or Firm*—Foley & Lardner

[57] ABSTRACT

The invention relates to an airbag apparatus for motor vehicles, in particular to a side airbag apparatus, comprising a gas generator (11), a gas filler tube (12) which is tightly connected thereto, which preferably is or can be laid in along the roof spar of the vehicle, which is provided with gas outflow openings (13) at predetermined distances and which is connected to an inflatable gas bag (14) which extends at least along a greater portion of its length and which preferably consists of individual cells (15), of which each is preferably associated with a gas outflow opening (13). The invention consists in that the gas outflow openings (13) are formed by incisions (17) in the wall of the gas filler tube (12) and by indentations (18) of the tube wall material at least at one side of the incisions (17).

28 Claims, 3 Drawing Sheets

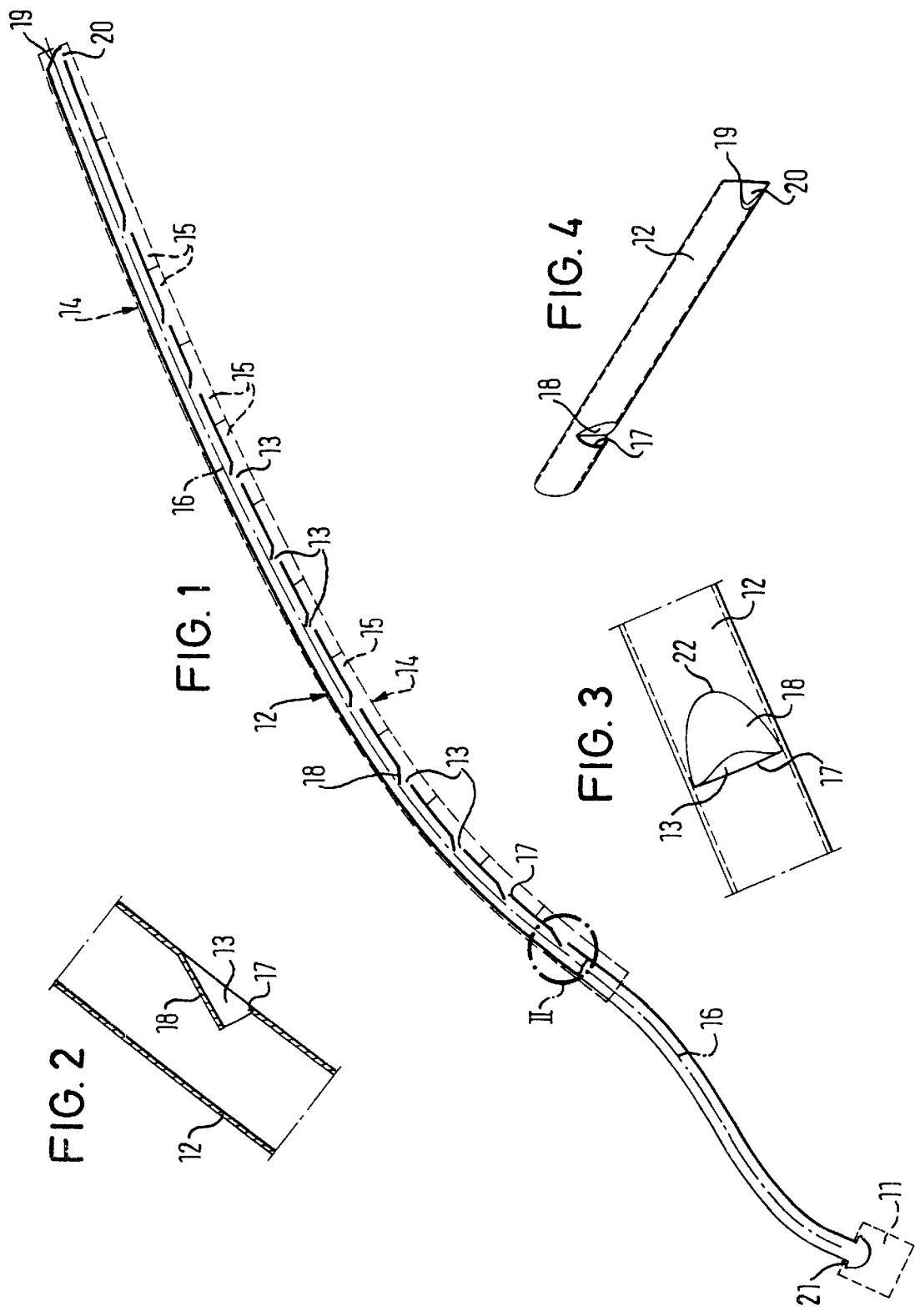

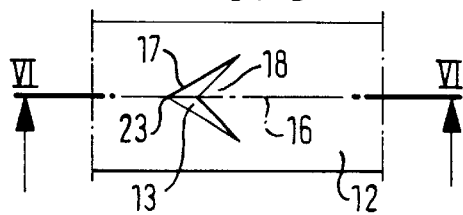
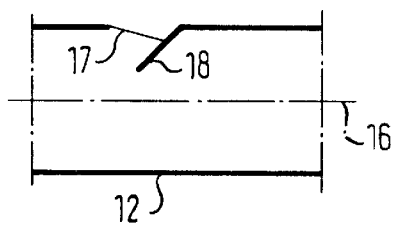
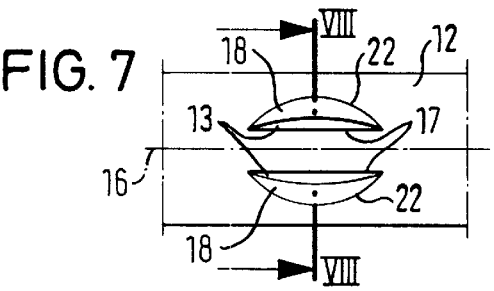
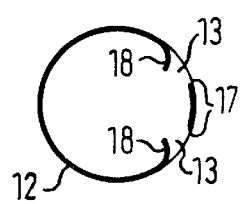
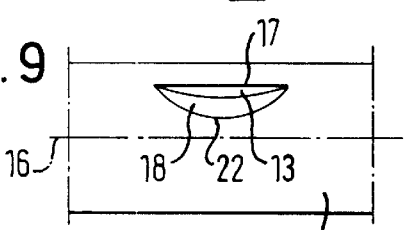
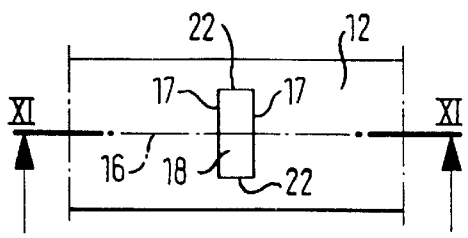
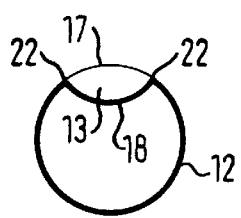
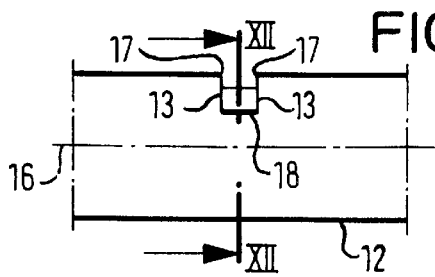

AIRBAG APPARATUS FOR MOTOR VEHICLES

The invention relates to an airbag apparatus for motor vehicles, in particular to a side airbag apparatus in accordance with the preamble of patent claim 1.

Airbag apparatuses of this kind are known in various embodiments (see e.g. DE-OS 22 22 621; WO 96/26087; DE 196 13 133 A1; DE 196 13 095 A1). The task of the gas filler tube consists in distributing the pressure gas produced by the gas generator on ignition in the desired manner over the individual regions of the gas bag, which extends over a certain length.

The object of the present invention consists in providing an airbag apparatus of the initially named kind in which the gas filler tube can be manufactured with simple and rational production techniques and a definite gas supply to the individual regions of the gas bag can equally well be ensured in a simple manner.

The features of the characterising part of claim 1 are provided for satisfying this object. Advantageous further developments of the invention can be found in the subordinate claims.

The idea of the invention is thus to be seen in that one produces the gas outflow openings by a simple cutting and indentations procedure, with it being possible to exactly preset the amount of gas flowing out of each gas outflow opening through the length and direction of the incision and the extent of the indentations.

Figure 14:
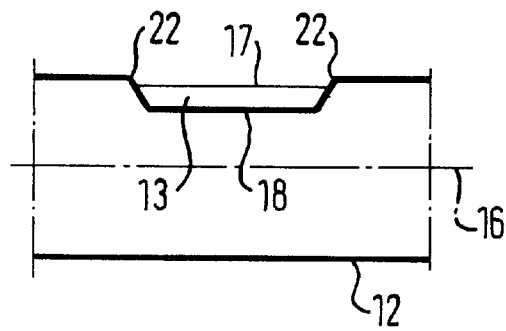
Figure 15:
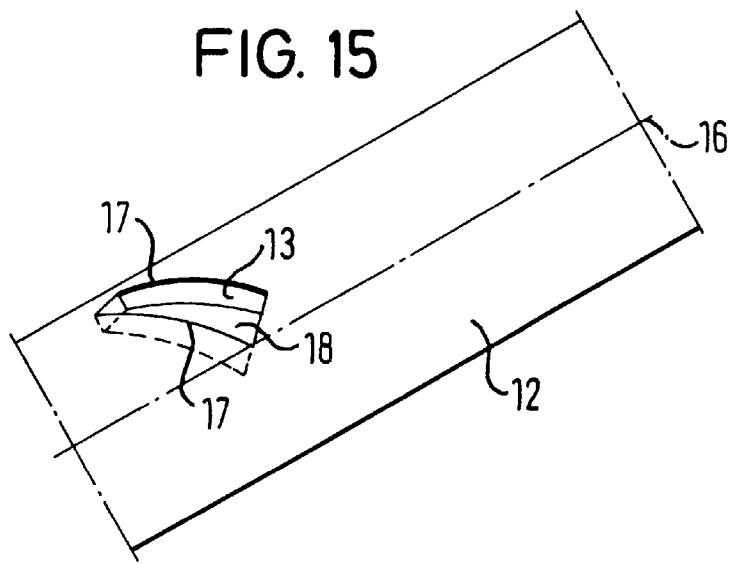

The invention will be explained in the following in an exemplary manner with reference to the drawing, in which are shown:

FIG. 1 a schematic side view of a side airbag apparatus in accordance with the invention, FIG. 2 the detail II of FIG. 1 on an enlarged scale, FIG. 3 a plan view of the gas filler tube in accordance with the invention in the region of a gas outflow opening 13 on an enlarged scale, FIG. 4 a perspective view of the end region of a gas filler tube which is provided for the airbag apparatus in accordance with the invention, FIG. 5 a plan view of a part of a further embodiment of a gas filler tube in accordance with the invention, FIG. 6 a schematic section along the line VI—VI in FIG. 5, FIG. 7 a plan view of a part of a further embodiment of a gas filler tube in accordance with the invention with two incisions arranged parallel to one another in the longitudinal direction with a spacing, FIG. 8 a schematic sectional view along line VIII—VIII in FIG. 7, FIG. 9 a side view of the object of FIG. 7, FIG. 10 a plan view of a part of a further embodiment of a gas filler tube in accordance with the invention, FIG. 11 a schematic sectional view along line XI—XI in FIG. 10, FIG. 12 a schematic sectional view along line XII—XII in FIG. 11, FIG. 13 a plan view of a part of a further embodiment of a gas filler tube in accordance with the invention, FIG. 14 a schematic sectional view along line XIV—XIV in FIG. 13 and FIG. 15 a perspective view of a section of a further embodiment of a gas filler tube in accordance with the invention.

In accordance with the drawings the generator-side end of a gas filler tube 12 has a flange 21, by means of which it is fastened in a manner secured against rotation to a gas generator 11, which is indicated in broken lines.

The gas filler tube 12 is laid in along the roof spar of a non-illustrated vehicle and is, where appropriate, provided with a row of gas outflow openings 13 which are arranged one after the other only beyond a certain distance from the gas generator. In the region of the gas outflow openings 13 the gas filler tube 12 is connected to an inflatable gas bag 14, which is only indicated in broken lines, and which can consist of individual cells 15, each of which is associated with a gas outflow opening 13.

As one sees in particular in FIGS. 2 to 4, the gas outflow openings 13 are formed by incisions 17 which extend transverse to the tube axis 16 and indentations 18 which are performed in the tube wall on the side of the incisions 17 which face away from the generator 11. In this way the indentations 18 form guide surfaces for the gas which flows from the gas generator 11 into the gas filler tube 12 and which in this way is blown out in the region of the individual gas outflow openings 13 in a defined manner into the individual cells 15 of the gas bag 14.

Through corresponding length of the incisions 17 and depth of the pressings in 18 the amount of gas escaping at the respective gas outflow opening 13 can be exactly predetermined. In particular it should be provided in accordance with the invention that the indentations are shallower in the vicinity of the generator and deeper in the regions facing away from the gas generator in order that sufficient gas is still available even in the region of the tube end for the entry into the gas bag 14.

At the end facing away from the generator 11 the gas filler tube 12 can be closed off, be contracted or have an outlet opening. In the illustrated exemplary embodiment however a indentation 19 is also present at the end of the gas filler tube 12 which is dimensioned in such a manner that an end opening 20 of a precisely defined size which serves for the inflation of the last cell 15 of the gas bag is still present even at the end of the gas filler tube 12 which faces away from the generator 11.

In FIG. 3 the transition line 22 between the indentations 18 and the undeformed part of the gas filler tube 12, which is formed in the manner of a parabola for the provision of particularly favourable flow relationships, is drawn in.

In the embodiment in accordance with FIG. 5 each gas outflow opening 13 is formed by a V-shaped incision 17 and a indentation 18 which is performed inside the limbs of the V. In this the apex 23 of the V points toward the end of the gas filler tube 12 at which the generator 11 is connected.

Depending on how deep the indentations 18 is bent in toward the interior of the gas filler tube 12, the amount of gas escaping from the gas outflow opening 13 can be controlled precisely.

In the exemplary embodiment in accordance with FIGS. 7 to 9, in each case two incisions 17 which extend parallel to the tube axis 16 at a small peripheral distance from one another are provided in the region of the gas outflow openings 13. The tube material between the incisions 17 is undeformed, whereas the indentations 18 are performed outside the incisions 17 in order to provide the gas outflow openings 13 of definite size. In FIGS. 7 and 9 the transition lines 22 between the indentations 18 and the undeformed tube material, which have a continuously curved extension, are again drawn in.

In the embodiment in accordance with FIGS. 10 to 12 two incisions 17 with slight spacing in the axial direction are provided parallel to one another per gas outflow opening. Between the two incisions 17 the indentations 18 is introduced in the manner which is particularly visible in FIGS. 11 and 12, through which the gas outflow openings 13 of definite size are formed. The transition lines 22 from the deformed to the undeformed tube material are located in each case at the end of the incisions 17 in the peripheral direction.

In accordance with FIGS. 13 and 14 in each case two equally long incisions 17 which are arranged parallel to one another extend parallel to the tube axis 16, similarly as was the case in the embodiment in accordance with the FIGS. 7 to 9. In the present exemplary embodiment however the indentations 18 is located between the incisions 17, whereas the material outside the incisions 17 is undeformed.

Since the indentations 18 have a greater length in the longitudinal direction of the gas filler tube 12 than the original tube material, in addition to a pure bending—as in the other exemplary embodiments—there occurs a permanent stretching of the material of the gas filler tube 12 in particular in the transition region to the undeformed tube material.

FIG. 15 shows an exemplary embodiment in a perspective view in which two incisions 17 are arranged with a slight spacing with respect to one another at an angle of approximately 45° to the tube axis 16. The indentations 18 for the forming of the gas outflow opening 13 is located, similarly as in the embodiment in accordance with FIGS. 10 to 12, between the two sections 17. As a result of the arrangement of the incisions 17 outside the longitudinal direction of the gas filler tube 12 it is possible to largely do without material stretching in the forming of the indentations 18.

| List of Reference Numerals |   |
| --- | --- |
| 11 | gas generator |
| 12 | gas filler tube |
| 13 | gas outflow opening |
| 14 | gas bag |
| 15 | cell |
| 16 | tube axis |
| 17 | incision |
| 18 | indentations |
| 19 | indentations |
| 20 | end opening |
| 21 | flange |
| 22 | transition line |
| 23 | apex |

What is claimed is:

1. Airbag apparatus for a motor vehicle, comprising:
   a gas generator,
   a gas filler tube which is connected thereto, which is adapted to be laid in along a roof spar of the vehicle, which is provided with gas outflow openings at predetermined distances and which is connected to an inflatable gas bag which extends at least along a greater portion of a length of the gas filler tube and which has individual cells, at least some of which are respectively associated with the gas outlfow openings,
   characterised in that the gas outflow openings are formed by incisions in the wall of the gas filler tube and by indentations of the tube wall material at least at one side of the incisions.

2. Apparatus in accordance with claim 1, characterised in that the incisions (17) are rectilinear.

3. Apparatus in accordance with claim 1, characterised in that the incisions (17) extend at least substantially transverse to the tube axis (16).

4. Apparatus in accordance with claim 1, characterised in that the incisions (17) extend at least substantially parallel to the tube axis (16).

5. Apparatus in accordance with claim 1, characterised in that the incisions extend at least substantially at an angle of 30° to 60° to the tube axis.

6. Apparatus in accordance with claim 1, characterised in that the indentations extend at the incision over its length.

7. Apparatus in accordance with claim 5, characterised in that a transition line between the indentations and the undeformed tube material of the gas filler tube is continuously curved.

8. Apparatus in accordance with claim 1, characterised in that the incisions are V-shaped.

9. Apparatus in accordance with claim 8, characterised in that the apex of the V-shaped incisions points toward the generator end of the gas filler tube.

10. Apparatus in accordance with claim 1, characterised in that only one incision is provided per gas outflow opening.

11. Apparatus in accordance with claim 1, characterised in that two incisions (17) are provided at a small spacing per gas outflow opening (13).

12. Apparatus in accordance with claim 11, characterised in that the indentations (18) are provided outside the incisions (17) and the tube material is undeformed between the incisions (17).

13. Apparatus in accordance with claim 11, characterised in that the indentations (18) are provided between the incisions (17) and the tube material is undeformed outside the incisions (17).

14. Apparatus in accordance with claim 1, characterised in that the indentations (18) are provided on the side of the incision (17) which faces away from the gas generator (11).

15. Apparatus in accordance with claim 1, characterised in that the end of the gas filler tube which faces away from the gas generator is at least partially closed by one or more indentations.

16. Apparatus in accordance with claim 1, characterised in that the gas filler tube (12) is widened or headed at the generator side and is thus secured to the housing of the generator (11).

17. Apparatus in accordance with claim 1, characterised in that the end of the gas filler tube (12) at the generator side is worked in such a manner that it also ensures a securing against rotation relative to the housing of the generator (11).

18. Apparatus in accordance with claim 1, characterised in that the gas filler tube (12) is matched to the contour of the roof spar by a large number of bending points and straight sections.

19. Apparatus in accordance with claim 1, characterised in that the gas outflow openings vary in at least one of form and size in such a manner that individual regions of the gas bag are inflated in a desired manner one after the other when the generator is ignited.

20. Apparatus in accordance with claim 1, characterised in that the gas filler tube has a first end and a second end, and a gas generator is connected at both ends of the gas filler tube.

21. Apparatus in accordance with claim 1, characterised in that the gas filler tube is adapted for fastening the gas bag.

22. Apparatus in accordance with claim 1, wherein the gas filler tube is metal.

23. Apparatus in accordance with claim 5, wherein incisions extend at an angle of approximately 45° to the tube axis.

24. Apparatus in accordance with claim 6, wherein the indentations continuously contract away from the incisions.

25. Apparatus in accordance with claim 7, wherein the transition line extends in a manner of a parabola.

26. Apparatus in accordance with claim 8, wherein the indentations are located inside the limbs of the V.

27. Apparatus in accordance with claim 15, wherein the end of the gas filler tube which faces away from the gas generator is completely closed by one or more indentations.

28. Apparatus in accordance with claim 1, wherein individual regions of the gas bag are inflated at the same time.

* * * * *